United States Patent
Uejima et al.

(10) Patent No.: US 7,696,842 B2
(45) Date of Patent: Apr. 13, 2010

(54) COMPOSITE HIGH-FREQUENCY COMPONENT AND MOBILE COMMUNICATION APPARATUS

(75) Inventors: Takanori Uejima, Moriyama (JP); Naoki Nakayama, Sakai (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 35 days.

(21) Appl. No.: 12/107,791

(22) Filed: Apr. 23, 2008

(65) Prior Publication Data

US 2008/0191812 A1    Aug. 14, 2008

Related U.S. Application Data

(63) Continuation of application No. PCT/JP2007/050664, filed on Jan. 18, 2007.

(30) Foreign Application Priority Data

Jan. 31, 2006   (JP) .............................. 2006-022755

(51) Int. Cl.
*H03H 9/70* (2006.01)
*H03H 9/72* (2006.01)

(52) U.S. Cl. ...................... 333/133; 333/132; 333/129; 333/101; 455/78; 455/83

(58) Field of Classification Search ................. 333/133, 333/101, 126, 129, 132, 193; 455/78, 83
See application file for complete search history.

(56) References Cited

U.S. PATENT DOCUMENTS

| | | | |
|---|---|---|---|
| 6,445,262 B1 * | 9/2002 | Tanaka et al. ................ | 333/133 |
| 6,633,748 B1 | 10/2003 | Watanabe et al. | |
| 7,200,365 B2 | 4/2007 | Watanabe et al. | |
| 7,295,814 B2 * | 11/2007 | Yamashita et al. ............ | 455/83 |
| 2004/0032706 A1 * | 2/2004 | Kemmochi et al. ...... | 361/306.3 |
| 2004/0087280 A1 | 5/2004 | Watanabe et al. | |
| 2005/0048927 A1 * | 3/2005 | Kemmochi et al. ........... | 455/78 |
| 2006/0044080 A1 * | 3/2006 | Hagiwara et al. ........... | 333/195 |
| 2006/0141944 A1 * | 6/2006 | Shibagaki et al. ............. | 455/78 |
| 2007/0030095 A1 * | 2/2007 | Hikita et al. ................. | 333/133 |
| 2007/0035362 A1 * | 2/2007 | Uejima et al. ............... | 333/133 |

(Continued)

FOREIGN PATENT DOCUMENTS

JP    2003-152590    *    5/2003

(Continued)

OTHER PUBLICATIONS

Machine Translation of JP 2003-152590 published on May 23, 2003.*

(Continued)

*Primary Examiner*—Barbara Summons
(74) *Attorney, Agent, or Firm*—Keating & Bennett, LLP (57) ABSTRACT

A composite high-frequency component includes a diplexer arranged to separate/combine transmission/reception signals in frequency bands of a plurality of communication systems, transmit/receive switches, filters, and a balanced-unbalanced reception signal switch, and a matching circuit. The balanced-unbalanced reception signal switch includes a reception signal switch and balanced-unbalanced filters. A stripline in the transmit/receive switch and a stripline in the reception signal switch are provided on the same layers, and the matching circuit including capacitors is arranged between the transmit/receive switch and the reception signal switch.

5 Claims, 8 Drawing Sheets

U.S. PATENT DOCUMENTS

2008/0122554 A1* 5/2008 Harada et al. .................. 333/25
2008/0258839 A1* 10/2008 Uejima et al. ............... 333/101
2009/0033437 A1* 2/2009 Harada ....................... 333/132

FOREIGN PATENT DOCUMENTS

| JP | 2004-166258 | * | 6/2004 |
| JP | 2004-187129 | * | 7/2004 |
| JP | 2005-020154 | * | 1/2005 |
| JP | 2005-244860 | A | 9/2005 |
| JP | 2005-260835 | A | 9/2005 |
| JP | 2005-260837 | A | 9/2005 |
| JP | 2005-295479 | A | 10/2005 |
| JP | 2005-303757 | A | 10/2005 |
| JP | 2005-311929 | A | 11/2005 |
| JP | 2005-333675 | A | 12/2005 |

OTHER PUBLICATIONS

Machine Translation of JP 2004-187129 published on Jul. 2, 2004.*
Machine Translation of JP 2005-020154 published on Jan. 20, 2005.*
Official communication issued in the International Application No. PCT/JP2007/050664, mailed on Feb. 6, 2007.

* cited by examiner

COMPOSITE HIGH-FREQUENCY COMPONENT AND MOBILE COMMUNICATION APPARATUS

BACKGROUND OF THE INVENTION

1. Field of the Invention

The present invention relates to composite high-frequency components and mobile communication apparatuses using the composite high-frequency components. In particular, the present invention relates to a composite high-frequency component which can be used for a plurality of different mobile communication systems and a mobile communication apparatus using the composite high-frequency component.

2. Description of the Related Art

Conventionally, dual band or multiband mobile communication apparatuses which perform communication using a plurality of communication systems corresponding to different frequency bands are used. For example, Japanese Unexamined Patent Application Publication No. 2000-201097 discloses a composite high-frequency component used in such a multiband mobile communication apparatus.

Figure 1:
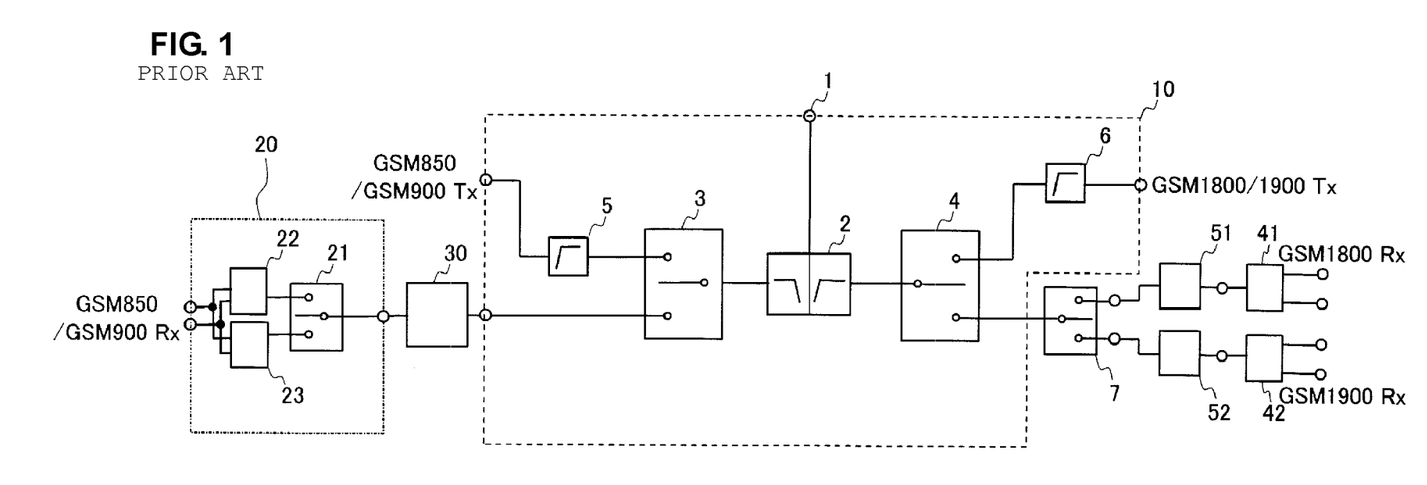
FIG. 1 illustrates a high-frequency circuit portion of a mobile communication apparatus using a conventional antenna switch module.

FIG. 1 illustrates a configuration of a high-frequency circuit portion in a mobile communication apparatus using the composite high-frequency component disclosed in Japanese Unexamined Patent Application Publication No. 2000-201097.

This high-frequency circuit is adapted to GSM1800 for the 1800 MHz band (DCS), GSM1900 for the 1900 MHz band (PCS), GSM850 for the 850 MHz band, and GSM900 for the 900 MHz band (EGSM).

In FIG. 1, the section of an antenna switch module 10 is the composite high-frequency component disclosed in Japanese Unexamined Patent Application Publication No. 2000-201097 which is configured as follows.

In FIG. 1, a diplexer 2 separates and combines transmission/reception signals for the GSM850/GSM900 systems and transmission/reception signals for the GSM1800/GSM1900 systems. A transmit/receive switch 3 switches transmission signals and reception signals for the GSM850/GSM900 systems. Similarly, a transmit/receive switch 4 switches transmission signals and reception signals for the GSM1800/GSM1900 systems. A filter 5 lets fundamental waves of transmission signals for the GSM850/GSM900 systems pass and attenuates harmonics of the transmission signals. Similarly, a filter 6 lets fundamental waves of transmission signals for the GSM1800/GSM1900 systems pass and attenuates harmonics of the transmission signals.

When a high-frequency circuit portion (front-end portion) of a mobile communication apparatus is made using this antenna switch module 10, an unbalanced-input-balanced-output SAW is used to make only a reception signal band pass and to remove a signal in an unnecessary frequency band and also to amplify a reception signal using a balanced low-noise amplifier (LNA). In FIG. 1, SAW filters 22 and 23 are filters for allowing reception signals for GSM850 and GSM900 pass, respectively. In addition, a reception signal switch 21 switches reception signals for GSM850 and GSM900. The SAW filters 22 and 23 and the reception signal switch 21 can define a balanced-unbalanced filter module 20.

A transmit/receive switch 7 switches a reception signal for GSM1800 and a reception signal for GSM1900. A SAW filter 41 allows a reception signal for GSM1800 to pass and produces a balanced output. A SAW filter 42 allows a reception signal of GSM1900 to pass and produces a balanced output.

In addition, in order to connect a SAW filter or a module having a SAW filter to the antenna switch module 10, matching circuits 30, 51, and 52 are provided therebetween.

In such a high-frequency circuit portion (front-end portion) which includes three balanced outputs and is compatible with three LNAs (low-noise amplifiers), as illustrated in FIG. 1, the matching circuits 30, 51, and 52 are provided between the antenna switch module 10 and the balanced-unbalanced filter module 20 and between the reception signal switch 7 and the SAW filters 41 and 42, respectively. Therefore, there is a problem in that the size of a mobile communication apparatus (mobile phone) increases because a large number of parts and a large mounting area are required in the overall high-frequency circuit portion.

In addition, it is necessary to adjust matching between the antenna switch module 10 and the balanced-unbalanced filter module 20 and between the antenna switch module 10 and the individual SAW filters 41 and 42. Thus, the design of a mobile communication apparatus is complicated.

SUMMARY OF THE INVENTION

To overcome the problems described above, preferred embodiments of the present invention provide a composite high-frequency component by combining a diplexer for processing transmission/reception signals in frequency bands of a plurality of communication systems, a transmit/receive switch for switching transmission/reception signals, and a balanced-unbalanced reception signal switch, and a mobile communication apparatus including the composite high-frequency component.

A composite high-frequency component for transmitting/receiving transmission/reception signals for a plurality of communication systems corresponding to different frequency bands using a single antenna includes a diplexer arranged to separate/combine the transmission/reception signals in the frequency bands of the plurality of communication systems on the basis of frequency bands, transmit/receive switches connected to the diplexer, each of which separate the transmission/reception signals for the plurality of communication systems into a transmission signal and a reception signal, filters connected to the transmit/receive switches, a balanced-unbalanced reception signal switch arranged to switch a reception signal in a first frequency band and a reception signal in a second frequency band and input a reception signal in an unbalanced state and output the reception signal in a balanced state, and a matching circuit provided between at least one of the plurality of transmit/receive switches and the balanced-unbalanced reception signal switch.

The balanced-unbalanced reception signal switch includes a reception signal switch having a first port arranged to input/output an unbalanced signal in the first frequency band, a second port arranged to input/output an unbalanced signal in the second frequency band, and a third port common to the unbalanced signal in the first frequency band and the unbalanced signal in the second frequency band, and to switch a signal path to the signal path between the third port and the first port or to the signal path between the third port and the second port, a first balanced-unbalanced filter which is connected to the first port and includes a fourth port arranged to input an unbalanced signal in the first frequency band and fifth and sixth ports arranged to output a balanced signal in the first frequency band, and of which the pass band is the first frequency band, and a second balanced-unbalanced filter which is connected to the second port and includes a seventh port arranged to input an unbalanced signal in the second frequency band and eighth and ninth ports arranged to output a balanced signal in the second frequency band, and of which the pass band is the second frequency band.

The diplexer, the transmit/receive switches, the filters, the balanced-unbalanced reception signal switch, and the matching circuit are integrated on a multilayer substrate composed of a laminate of a plurality of ceramic sheet layers.

Further, the first and second balanced-unbalanced filters are defined by, for example, balanced-unbalanced-type surface acoustic wave filters or balanced-unbalanced-type thickness extensional vibration piezoelectric filters.

Further, the electrical length from the fifth port to the first branch port in the first frequency band is substantially equal to the electrical length from the sixth port to the second branch port in the first frequency band, and the electrical length from the eighth port to the first branch port in the second frequency band is substantially equal to the electrical length from the ninth port to the second branch port in the second frequency band.

Further, a stripline arranged between the second port and the third port and a stripline in the transmit/receive switch connected to the balanced-unbalanced filters via the matching circuit are provided on the same sheet layers of the multilayer substrate.

Further, the matching circuit preferably includes a capacitor.

A mobile communication apparatus according to another preferred embodiment of the present invention includes the composite high-frequency component having any of the above-described configurations in a high-frequency circuit portion.

The diplexer for separating/combining transmission/reception signals in frequency bands of a plurality of communication systems, the transmit/receive switches, the filters, the balanced-unbalanced filters, and the matching circuit are integrated on a multilayer substrate composed of a laminate of a plurality of ceramic sheet layers. This reduces the number of parts, reduces the size and weight of a mobile communication apparatus, and simplifies the circuit design of a high-frequency circuit portion in the mobile communication apparatus.

In addition, this facilitates mounting of the first and second balanced-unbalanced filters on a surface of the laminate and fabrication of the matching circuit in the interior of the laminate, which reduces the size and weight of the entire mobile communication apparatus.

The first and second balanced-unbalanced filters are defined by balanced-unbalanced-type surface acoustic wave filters or balanced-unbalanced-type thickness extensional vibration piezoelectric filters. This allows the pass band of one of the filters to be blocked by the other filter, and thus, leakage of signals is reduced and low loss is achieved.

The electrical length from the fifth port to the first branch port in the first frequency band is substantially equal to the electrical length from the sixth port to the second branch port in the first frequency band, and the electrical length from the eighth port to the first branch port in the second frequency band is substantially equal to the electrical length from the ninth port to the second branch port in the second frequency band. This indicates that a matching element is connected at locations where phases are substantially equal as seen from the balanced ports of the first and second balanced-unbalanced filters. Accordingly, the wiring between these ports and the arrangement of the matching element do not adversely impair the balancing characteristics. That is, since the electrical length between the fifth port and the first branch port is substantially equal to the electrical length between the sixth port and the second branch port in the first frequency band, the balancing characteristics in the first frequency band can be maintained. Since the electrical length between the eighth port and the first branch port is substantially equal to the electrical length between the ninth port and the second branch port in the second frequency band, the balancing characteristics in the second frequency band can be maintained. Thus, satisfactory electrical characteristics can be maintained.

The stripline arranged between the second port and the third port and the stripline in the transmit/receive switch connected to the balanced-unbalanced filters via the matching circuit are provided on the same sheet layers of the multilayer substrate. This allows for a reduction of the number of sheets, and thus, a reduction of the profile can be achieved. In addition, the diplexer, the transmit/receive switches, the filters, the balanced-balanced reception signal switch, and the matching circuit are integrated. This eliminates unnecessary routing that is required when these components are disposed on plural layers in the multilayer substrate together with other striplines, and thus further downsizing can be achieved.

The matching circuit preferably includes and is defined by capacitors. Thus, it is not necessary to provide a circuit for separating a direct current supplied when a voltage to control the transmit/receive switch and the balanced-unbalanced reception signal switch is applied, between the transmit/receive switch and the balanced-unbalanced reception signal switch, which enables a further reduction of the number of components.

Since the balanced-unbalanced filter module is provided in the high-frequency circuit portion, a small and low-cost mobile communication apparatus which processes a plurality of communication signals in different frequency bands can be obtained.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Referring to FIG. 2 to FIG. 5, a composite high-frequency component according to a first preferred embodiment according to the present invention will be described.

Figure 2:
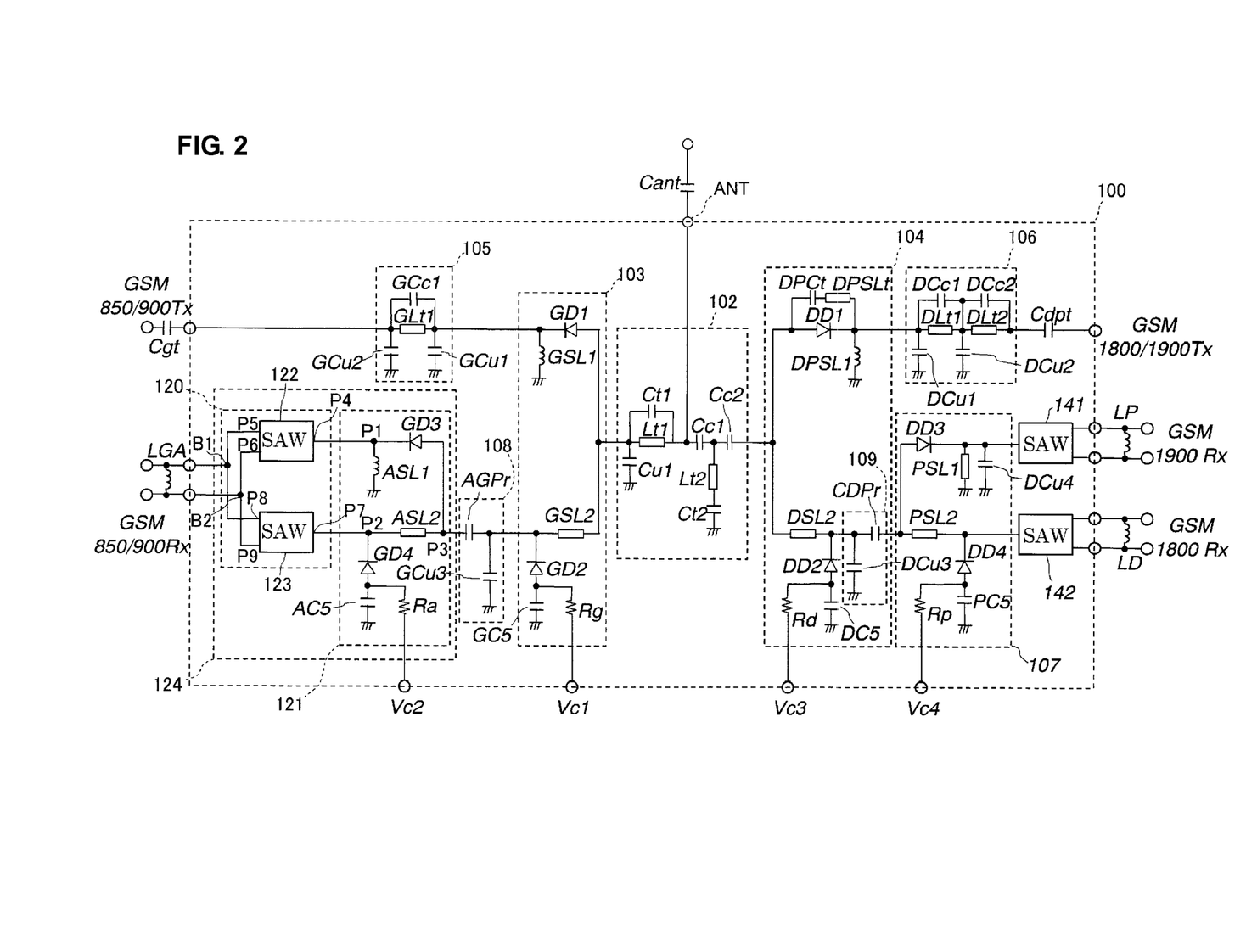
FIG. 2 is a circuit diagram of a composite high-frequency component according to a first preferred embodiment of the present invention.

FIG. 2 is a circuit diagram of the composite high-frequency component. This composite high-frequency component 100 is compatible with four frequency bands for GSM850, GSM900, GSM1800, and GSM1900.

The composite high-frequency component 100 includes a diplexer 102, transmit/receive switches 103 and 104, filters 105 and 106, a reception signal switch 107, a balanced-unbalanced reception signal switch 124, and a matching circuit 108. The balanced-unbalanced reception signal switch 124 includes a reception signal switch 121 and a SAW duplexer 120.

The diplexer 102 has a low-pass filter portion including capacitors Cu1 and Ct1 and a stripline Lt1, and a high-pass filter portion including capacitors Cc1, Cc2, and Ct2 and a stripline Lt2. The diplexer 102 is connected to an antenna terminal ANT.

The transmit/receive switch 103 is connected to the low-pass filter side of the diplexer 102. This transmit/receive switch 103 includes a diode GD1 and an inductor GSL1 at the transmission signal input side for GSM850/900 and includes a diode GD2, a stripline GSL2, a capacitor GC5, and a resistor Rg at the reception signal output side for GSM850/900. The transmit/receive switch 103 is arranged to input a transmit/receive switch signal for GSM850/900 from a terminal Vc1.

The other transmit/receive switch 104 is connected to the high-pass filter side of the diplexer 102. This transmit/receive switch 104 includes a diode DD1, an inductor DPSL1, a stripline DPSLt, and a capacitor DPCt at the transmission signal input side for GSM1800/1900 and includes a diode DD2, a stripline DSL2, capacitors DC5, DCu3, and CDPr, and a resistor Rd. The transmit/receive switch 104 is arranged to switch transmission and reception for GSM1800/1900 using a control terminal Vc3. Note that a matching circuit 109 including the capacitors CDPr and DCu3 is provided between the reception signal output side of the transmit/receive switch 104 and the input side of the reception signal switch 107.

The reception signal switch 107 is connected to the reception signal output side of the transmit/receive switch 104. This reception signal switch 107 includes a diode DD3, a stripline PSL1, and a capacitor DCu4 at the reception signal output side of the GSM1900 side and includes a diode DD4, a stripline PSL2, a capacitor PC5, and a resistor Rp at the reception signal output side of the GSM1800 side. The reception signal switch 107 is arranged to switch GSM1900 and GSM1800 in accordance with a control signal from a control terminal Vc4.

The reception signal switch 121 is connected to the reception signal output side of the transmit/receive switch 103. This reception signal switch 121 includes a diode GD3 and an inductor ASL1 at the reception signal output side for GSM850 and includes a diode GD4, a stripline ASL2, a capacitor AC5, and a resistor Ra at the reception signal output side for GSM900. The reception signal switch 121 is arranged to switch GSM850 and GSM900 in accordance with a control signal from a control terminal Vc2. This reception signal switch 121 includes a first port P1 arranged to output a GSM850 reception signal in an unbalanced state, a second port P2 arranged to output a GSM900 reception signal in an unbalanced state, and a third port P3 which is common to the unbalanced signals in the frequency bands of GSM850 and GSM900.

The filter 105 is a low-pass filter which allows the frequency bands of GSM850/900 transmission signals to pass and blocks signals with frequency components of, in particular, third harmonics in GSM850/900. This filter 105 defines a low-pass filter circuit with a stripline GLt1 and capacitors GCu1, GCu2, and GCc1, and is connected to the transmission signal input side of the transmit/receive switch 103.

The filter 106 is a low-pass filter which allows the frequency bands of GSM1800/1900 transmission signals to pass and blocks signals with frequency components of, in particular, second and third harmonics in GSM1800/1900. This filter 106 includes striplines DLt1 and DLt2 and capacitors DCu1, DCu2, DCc1, and DCc2, and is connected to the transmission signal input side of the transmit/receive switch 104.

The SAW duplexer 120 is defined by first and second SAW filters (surface acoustic wave filters) and includes a first SAW filter (first balanced-unbalanced filter) 122 and a second SAW filter (second balanced-unbalanced filter) 123. The first SAW filter 122 includes a fourth port P4 arranged to input a GSM850 reception signal in an unbalanced state and fifth and sixth ports P5 and P6 arranged to output a corresponding balanced signal. Similarly, the second SAW filter 123 includes a seventh port P7 arranged to input a GSM900 reception signal in an unbalanced state and eighth and ninth ports P8 and P9 arranged to output a corresponding balanced signal.

One of the ports of the balanced output of the first SAW filter 122 (the fifth port P5) and one of the ports of the balanced output side of the second SAW filter 123 (the eighth port P8) are commonly connected by a first branch port B1. The other port of the balanced input/output of the first SAW filter 122 (the sixth port P6) and the other port of the balanced input/output of the second SAW filter 123 (the ninth port P9) are commonly connected by a second branch port B2. It is configured such that a matching element LGA (balance coil) for providing impedance matching for both the balanced signals for GSM850 and GSM900 is connected. The electrical length from the fifth port P5 to the first branch port B1 in the frequency band of GSM850 is substantially equal to the electrical length from the sixth port P6 to the second branch port B2 in the frequency band of GSM850. In addition, the electrical length from the eighth port P8 to the first branch port B1 in the frequency band of GSM900 is substantially equal to the electrical length from the ninth port P9 to the second branch port B2 in the frequency band of GSM900.

The matching circuit 108 is provided between the reception signal output of the transmit/receive switch 103 in the GSM850/950 side and the reception signal switch 121. To provide impedance matching between the transmit/receive switch 103 and the reception signal switch 121, the matching circuit 108 includes a capacitor AGPr in series with a line and a capacitor GCu3 connected between a line and ground.

The SAW filter 141 includes an unbalanced input port connected to the GSM1900 reception signal output side of the reception signal switch 107 for GSM1800/1900. A matching element (balance coil) LP is connected to balanced output ports of the SAW filter 141. The SAW filter 142 includes an unbalanced input port connected to the GSM1800 reception signal output side of the reception signal switch 107. A matching element (matching coil) LD is connected to balanced output ports of the SAW filter 142.

Operations of the reception signal switch 121 are described below. Firstly, when a high-level signal is applied to the control terminal Vc2, the diodes GD4 and GD3 are turned on. This brings the diode GD3 into conduction, so that a signal path between the first port P1 and the third port P3 is brought into conduction. On the other hand, the electrical length of the line ASL2 is set to be approximately a quarter wavelength in the frequency band of GSM850. The turning on of the diode GD4 causes the port P2 side of the line ASL2 to be equivalently grounded, and the impedance as seen from the port P3 toward the port P2 side is equivalently open.

When a low-level signal is applied to the control terminal Vc2, the diode GD4 is turned off, so that a signal path is provided between the second port P2 and the third port P3 via the line ASL2. On the other hand, the diode GD3 is also turned off, so that the signal path between the first port P1 and the third port P3 is broken. In the off-state of the diode GD3, the impedance as seen from the third port P3 toward the first port P1 is open.

The SAW filter 122 allows the first frequency band (GSM850) to pass and blocks a second frequency band (GSM900). Thus, a reception signal for GSM850 is output to the reception signal output port for GSM850/900 while the reception signal switch 121 selects the signal path of the first port P1 side. On the other hand, the SAW filter 123 allows signals in the second frequency band (GSM900) to pass and blocks signals in the first frequency band (GSM850). Thus, a reception signal for GSM900 is output to the reception signal output port for GSM850/900 while the reception signal switch 121 selects the signal path of the second port P2 side.

In this manner, the pass band of the one of the two SAW filters 122 and 123 is the cutoff frequency band of the other filter, leakage of signals in the first and second frequency bands can be reduced, and one balanced output port can be shared with low loss.

In addition, as described above, the electrical length from the fifth port P5 to the first branch port B1 in the frequency band of GSM850 is substantially equal to the electrical length from the sixth port P6 to the second branch port B2 in the frequency band of GSM850. The electrical length from the eighth port P8 to the first branch port B1 in the frequency band of GSM900 is substantially equal to the electrical length from the ninth port P9 to the second branch port B2 in the frequency band of GSM900. This indicates that the balance coil LGA is connected at locations at which the phases are substantially equal as seen from the balanced ports of the SAW filters 122 and 123. Accordingly, the wiring between these individual ports and the placing of the matching element do not adversely affect the balance characteristics, and thus, satisfactory electrical characteristics can be maintained.

Referring to FIG. 3 to FIG. 6, an example of a configuration obtained when the above-described composite high-frequency component is integrated on a multilayer substrate composed of a laminate of a plurality of ceramic sheet layers.

Figure 3:
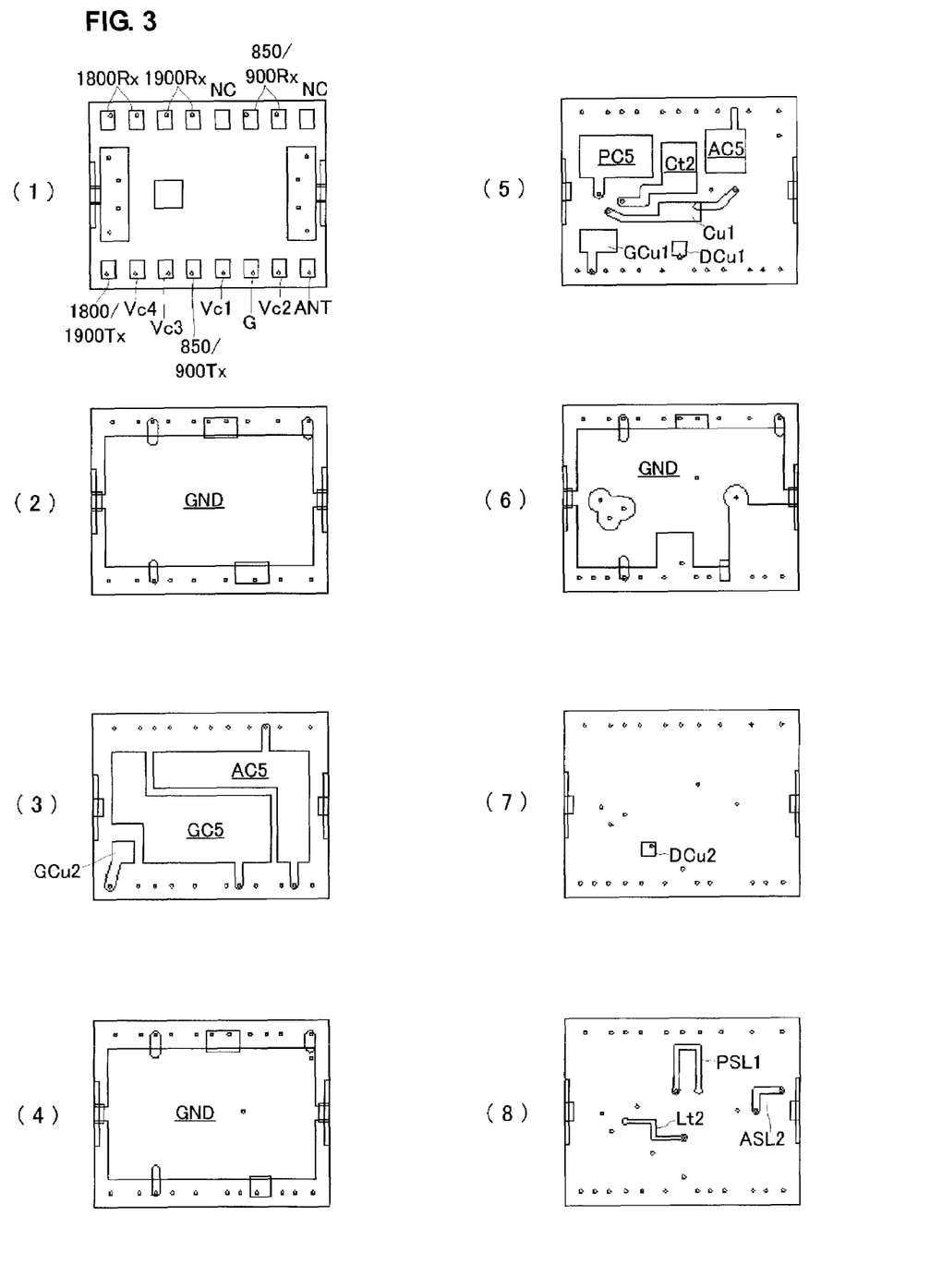
FIG. 3 is a diagram illustrating conductor patterns of individual layers of a multilayer substrate composed of a laminate of plurality of ceramic sheet layers.

FIG. 3 to FIG. 6 are plan views of conductor patterns of individual layers. FIG. 3(1) illustrates the bottom layer and FIG. 5(21) illustrates the top layer. The conductor patterns are illustrated separately in three figures, FIG. 3 to FIG. 5, to facilitate illustration thereof. The reference characters of the components in FIG. 3 to FIG. 5 correspond to the reference characters in the circuit illustrated in FIG. 2. The reference character GND denotes a ground electrode. LGA, Cgt, AC5, GSL1, Cant, DPSL1, Cdpt, LP, and LD in FIG. 2 are disposed on a circuit board of a separate mobile communication apparatus which implements this composite high-frequency component, and thus are not shown in FIG. 3 to FIG. 5.

In FIG. 3(1), the reference character G denotes a ground terminal and the reference character NC denotes a free terminal. The other terminals correspond to the reference characters in the circuit illustrated in FIG. 2.

Figure 4:
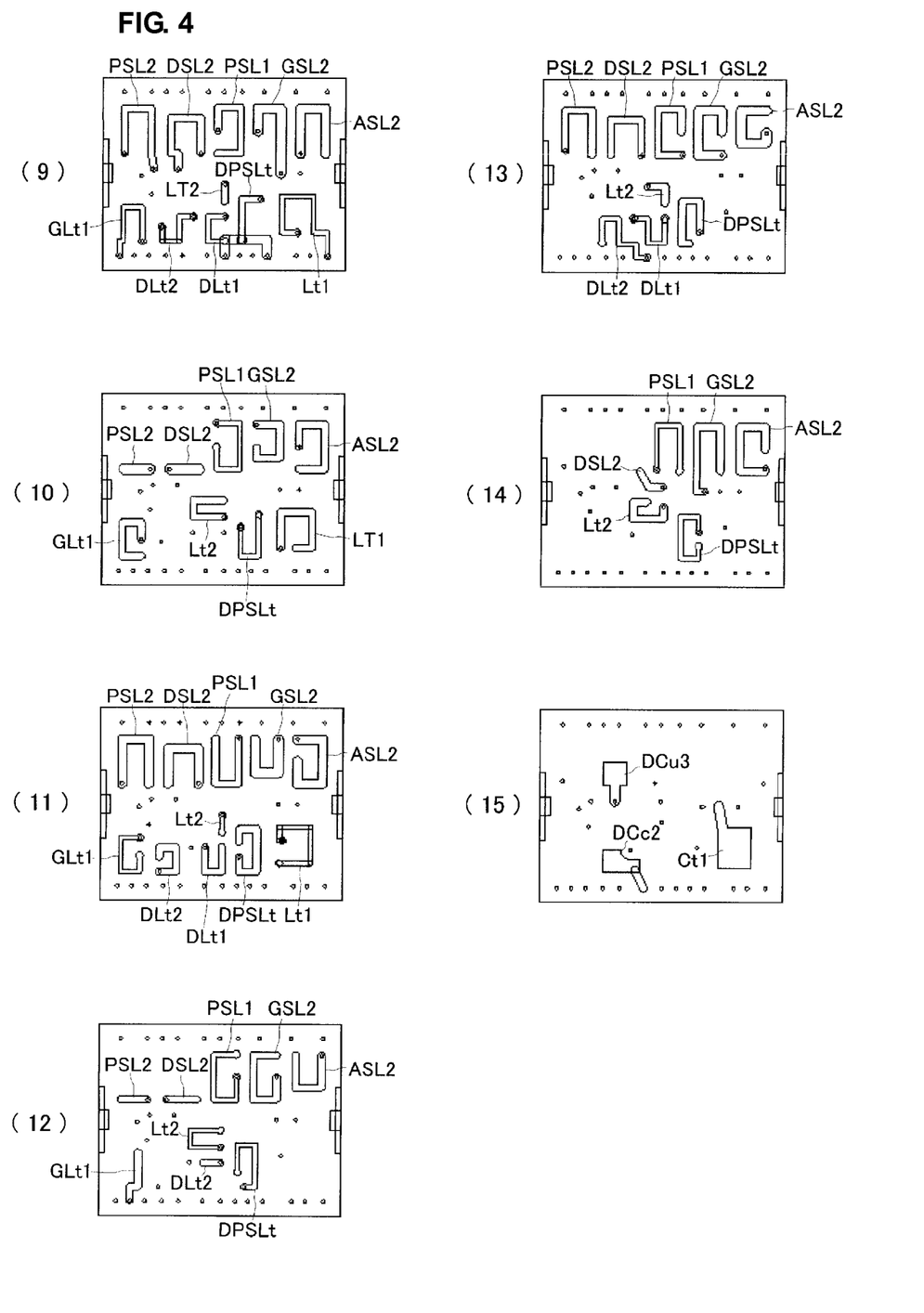
FIG. 4 illustrates conductor patterns of individual layers following those shown in FIG. 3.
Figure 5:
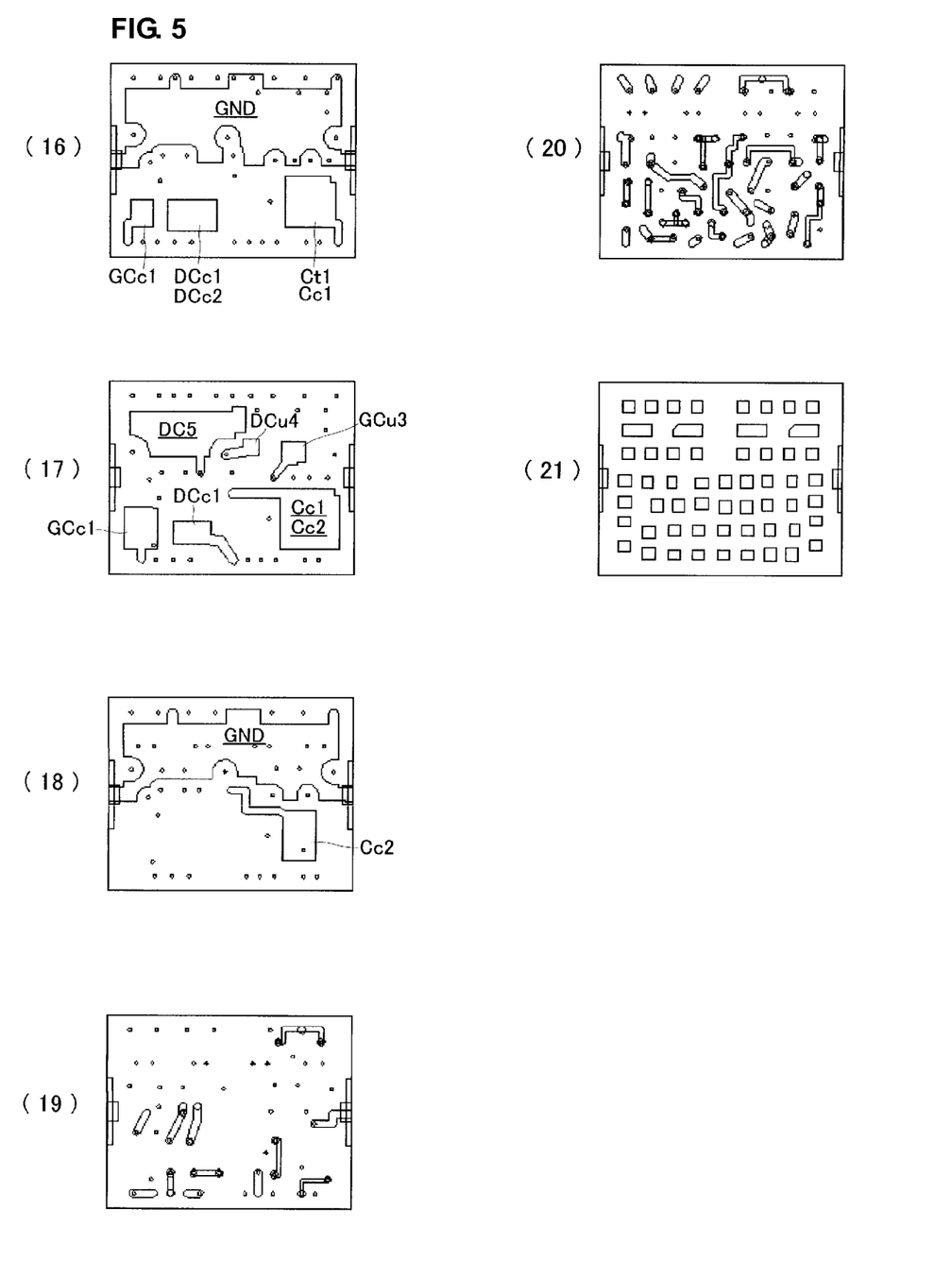
FIG. 5 illustrates conductor patterns of individual layers following those shown in FIG. 4.

As illustrated in FIG. 3 and FIG. 4, the stripline ASL2 is formed through the layers (8) to (14). As illustrated in FIG. 4, the stripline GSL2 is provided on the layers (9) to (14). The stripline PSL2 is provided on the layers (9) to (13). Similarly, the stripline DSL2 is provided on the layers (9) to (14). In this manner, the individual striplines with predetermined electrical lengths used in the high-frequency switches are provided on substantially the same layers. This allows the configuration of the striplines in a limited area and with a limited number of layers, which prevents an increase in the chip size even when the entire circuit scale increases.

Figure 6:
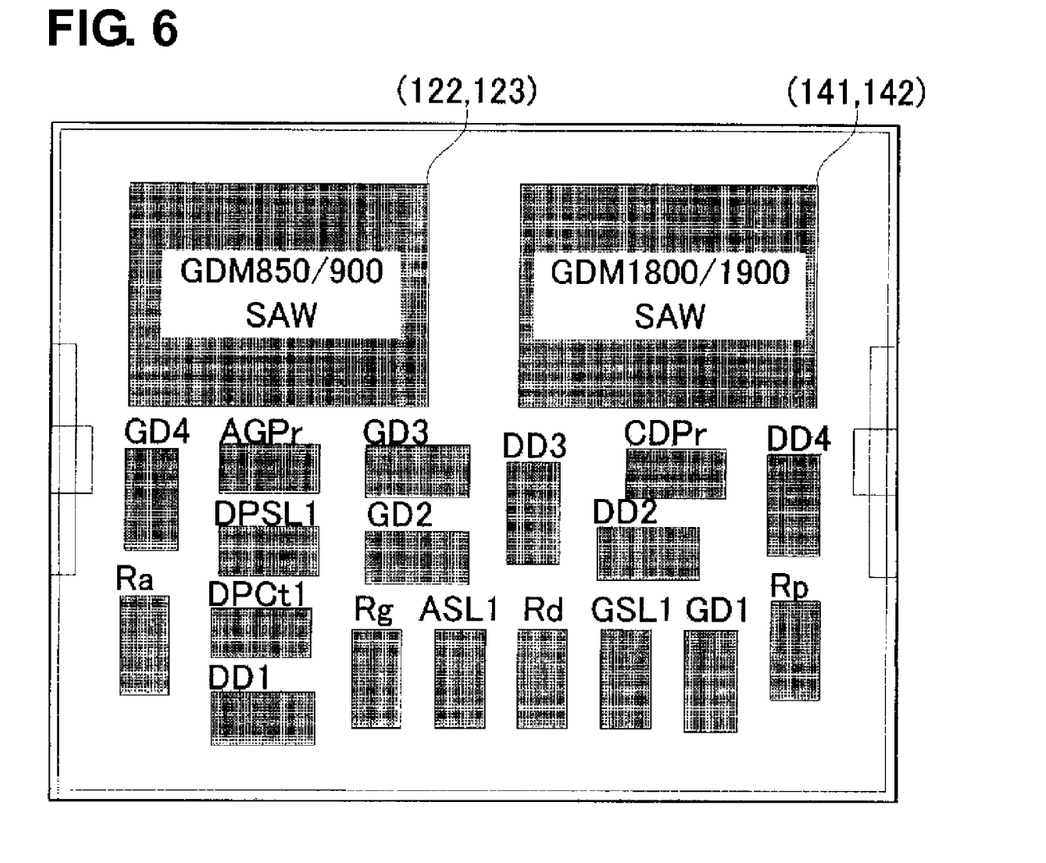
FIG. 6 illustrates the top layer of the laminate of the composite high-frequency component.

FIG. 6 illustrates chip components mounted on the top surface of the laminate. A SAW filter (122, 123) is a dual SAW filter including the two SAW filters 122 and 123 for GSM850/900 illustrated in FIG. 2. Similarly, a SAW filter (141, 142) is a dual SAW filter including the two SAW filters 141 and 142 for GSM1800/1900 illustrated in FIG. 2.

As described above, in the composite high-frequency component according to this preferred embodiment of the present invention, a diplexer arranged to transmit/receive transmission/reception signals for a plurality of communication systems corresponding to different frequency bands, transmit/receive switches each separating transmission/reception signals for the plurality of communication systems into a transmission signal and a reception signal, filters connected to the transmit/receive switches, and balanced-unbalanced filters for inputting/outputting signals in two frequency bands in balanced/unbalanced states are integrated and designed. This design allows a configuration in which matching is achieved beforehand between an antenna switch circuit, which includes the transmit/receive switches and the diplexer, and the above-described balanced/unbalanced filters. Therefore, it is not necessary to externally provide a matching element.

In addition, the striplines used for the antenna switch circuit and the striplines used for the balanced/unbalanced filters are provided on the same layers in the multilayer substrate. This reduces the area occupied with both the striplines and prevents an increase in the chip size.

Further, because of the one-chip configuration using a ceramic multilayer substrate, loss due to wiring between components is reduced as compared to a configuration using discrete components.

Moreover, spaces between components can be removed as compared to a configuration in which a switchplexer (antenna switch module) and a matching circuit are separately provided on a substrate, and thus, the size of the entire component can be reduced.

The matching circuits 108 and 109 in this preferred embodiment are preferably defined by GCu3 and AGPr, and DCu3 and CDPr, respectively. However, if matching can be achieved using only AGPr and CDPr, the matching circuits 108 and 109 can be defined by only AGPr and CDPr.

Second Preferred Embodiment

In the following, a composite high-frequency component according to a second preferred embodiment will be described with reference to FIG. 7.

This composite high-frequency component is different from the composite high-frequency component illustrated in FIG. 2, in that the reception signal output ports for GSM1800/1900 are configured as single (shared) balanced output ports. Specifically, a reception signal for GSM1800 or 1900 is output from the common balanced output ports in which the balanced output ports of the two SAW filters 141 and 142 are combined. In addition, similarly to the reception signal output ports for GSM850/900, a matching element (matching coil) LD is connected between the two ports.

Figure 7:
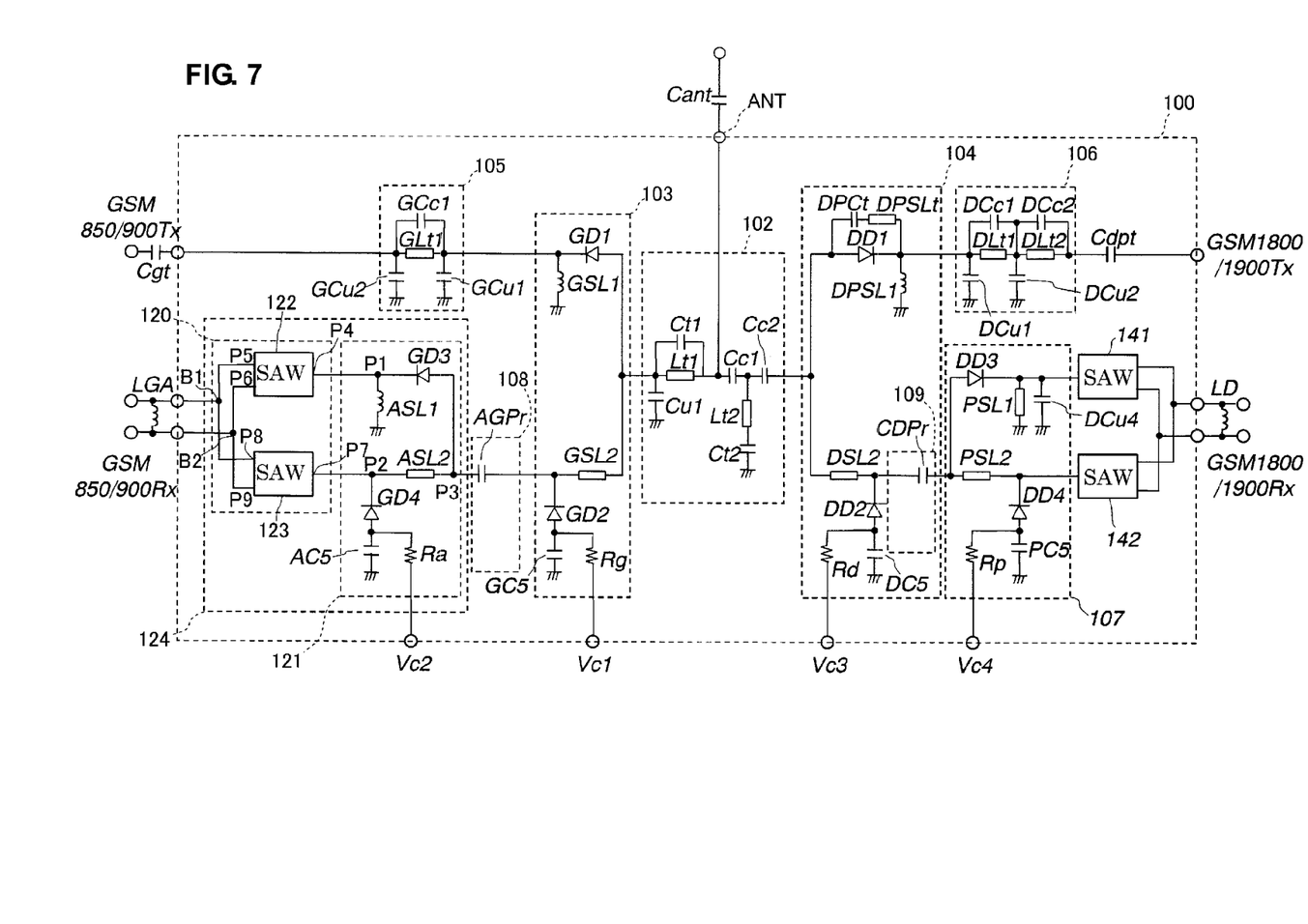
FIG. 7 is a circuit diagram illustrating a composite high-frequency component according to a second preferred embodiment of the present invention.

In the example illustrated in FIG. 7, a matching circuit 108 between the reception signal output side of the transmit/receive switch 103 and the input side of a reception signal switch 121 is preferably defined by only a capacitor AGPr. In addition, a matching circuit 109 between the reception signal output side of a transmit/receive switch 104 and the input side of the reception signal switch 107 is preferably defined by only a capacitor CDPr. However, it is also possible to provide capacitors GCu3 and DCu3 in parallel in the matching circuits 108 and 109, respectively, as in the case of the first preferred embodiment.

In the first and second preferred embodiments, SAW filters are preferably used as balanced-unbalanced filters. However, it is also possible to use thickness extensional vibration piezoelectric filters (BAW filters) instead of the SAW filters (surface acoustic wave filters).

Third Preferred Embodiment

In the following, a configuration of a mobile communication apparatus according to a third preferred embodiment will be described with reference to FIG. 8.

Figure 8:
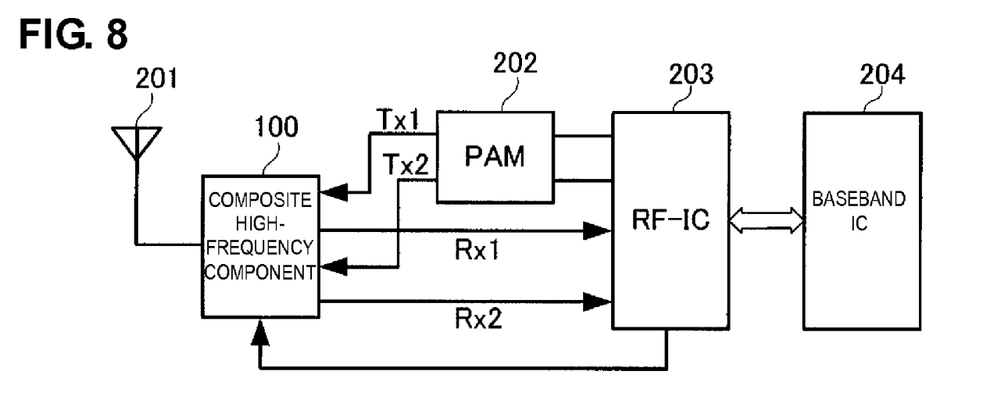
FIG. 8 illustrates a configuration of a mobile communication apparatus according to a third preferred embodiment of the present invention.

FIG. 8 illustrates a configuration of a quadband mobile phone in a block diagram. A high-frequency circuit portion of the mobile phone is provided with the composite high-frequency component 100 described in the first and second preferred embodiments. This composite high-frequency component 100 includes an antenna terminal connected to an antenna 201 and inputs a transmission signal Tx1 for GSM1800/1900 and a transmission signal Tx2 GSM850/900 and outputs a reception signal Rx1 for GSM1800/1900 and a reception signal Rx2 for GSM850/900. A high-frequency integrated circuit 203 supplies control signals to the individual control terminals Vc1 to Vc4 of the composite high-frequency component 100 and performs switching of transmission and reception and switching of reception signals. A power amplifier module 202 amplifies power of a transmission signal output from the high-frequency integrated circuit 203 and supplies the amplified transmission signal to the composite high-frequency component 100. A baseband IC 204 performs input/output of an audio signal or other suitable signal to/from the high-frequency integrated circuit 203 and performs processing of signals in the baseband.

In this manner, by using the composite high-frequency component illustrated in the first and second preferred embodiments in the high-frequency circuit portion (front-end portion), a quadband mobile phone can be readily fabricated without an additional matching circuit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A composite high-frequency component for transmitting/receiving transmission/reception signals for a plurality of communication systems corresponding to different frequency bands using a single antenna, the composite high-frequency component comprising:

a diplexer arranged to separate/combine the transmission/reception signals in the frequency bands of the plurality of communication systems on the basis of frequency bands;

transmit/receive switches connected to the diplexer, each of the transmit/receive switches separating the transmission/reception signals for the plurality of communication systems into a transmission signal and a reception signal;

filters connected to the transmit/receive switches;

a balanced-unbalanced reception signal switch arranged to switch a reception signal in a first frequency band and a reception signal in a second frequency band and input a reception signal in an unbalanced state and output the reception signal in a balanced state; and a matching circuit provided between at least one of the transmit/receive switches and the balanced-unbalanced reception signal switch; wherein the balanced-unbalanced reception signal switch includes:
   a reception signal switch having a first port arranged to output an unbalanced signal in the first frequency band, a second port arranged to output an unbalanced signal in the second frequency band, and a third port common to the unbalanced signal in the first frequency band and the unbalanced signal in the second frequency band, and to switch a signal path to the signal path between the third port and the first port or to the signal path between the third port and the second port;
   a first balanced-unbalanced filter which is connected to the first port and includes a fourth port arranged to input an unbalanced signal in the first frequency band and fifth and sixth ports arranged to output a balanced signal in the first frequency band, and of which the pass band is the first frequency band; and
   a second balanced-unbalanced filter which is connected to the second port and includes a seventh port arranged to input an unbalanced signal in the second frequency band and eighth and ninth ports arranged to output a balanced signal in the second frequency band, and of which the pass band is the second frequency band;

in the diplexer, the transmit/receive switches, the filters, the balanced-unbalanced reception signal switch, and the matching circuit are integrated on a multilayer substrate composed of a laminate of a plurality of ceramic sheet layers;

the fifth port and the eighth port are commonly connected to a first branch port;

the sixth port and the ninth port are commonly connected to a second branch port; and an electrical length from the fifth port to the first branch port in the first frequency band is substantially equal to an electrical length from the sixth port to the second branch port in the first frequency band, and an electrical length from the eighth port to the first branch port in the second frequency band is substantially equal to an electrical length from the ninth port to the second branch port in the second frequency band.

2. The composite high-frequency component of claim 1, wherein the first and second balanced-unbalanced filters are one of balanced-unbalanced-type surface acoustic wave filters and balanced-unbalanced-type thickness extensional vibration piezoelectric filters.

3. The composite high-frequency component of claim 1, wherein a stripline arranged between the second port and the third port and a stripline in the transmit/receive switch connected to the balanced-unbalanced filters via the matching circuit are provided on the same sheet layers of the multilayer substrate.

4. The composite high-frequency component of claim 1, wherein the matching circuit includes a capacitor.

5. A mobile communication apparatus comprising the composite high-frequency component of claim 1 in a high-frequency circuit portion.

* * * * *